US012804215B2

(12) United States Patent
May, Jr. et al.

(10) Patent No.: US 12,804,215 B2
(45) Date of Patent: *Nov. 17, 2026

(54) UNIQUE PLAYLIST CREATION USING VARIABLE SUBSTITUTION IN VIDEO DELIVERY

(71) Applicants: HULU, LLC, Santa Monica, CA (US); Disney Enterprises, Inc., Burbank, CA (US)

(72) Inventors: William B. May, Jr., Sunnyvale, CA (US); Zachary McKeel Cava, Seattle, CA (US)

(73) Assignees: HULU, LLC, Santa Monica, CA (US); Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,290

(22) Filed: Oct. 5, 2022

(65) Prior Publication Data

US 2024/0121459 A1 Apr. 11, 2024

(51) Int. Cl.
*H04N 21/262* (2011.01)
*H04N 21/236* (2011.01)

(52) U.S. Cl.
CPC ..... *H04N 21/26258* (2013.01); *H04N 21/236* (2013.01)

(58) Field of Classification Search
CPC ........... H04N 21/26258; H04N 21/236; H04N 21/2187; H04N 21/2381; H04N 21/2665; H04N 21/812
USPC .......................................................... 725/131
See application file for complete search history.

(56) References Cited

U.S. PATENT DOCUMENTS

| | | | |
|---|---|---|---|
| 5,333,135 | A | 7/1994 | Wendorf |
| 8,880,633 | B2 | 11/2014 | Brookins et al. |
| 9,015,741 | B2 | 4/2015 | Gordon |
| 9,247,257 | B1 | 1/2016 | Wilkins |

(Continued)

FOREIGN PATENT DOCUMENTS

| | | |
|---|---|---|
| CN | 108650558 B | 10/2018 |

OTHER PUBLICATIONS

U.S. Appl. No. 17/938,297, filed Oct. 5, 2022, Inventor Nicholas Brookins, Titled: "Generation of Unique Presentation of Media Content", 48 pages.

(Continued)

*Primary Examiner* — Alfonso Castro
(74) *Attorney, Agent, or Firm* — Kwan & Olynick LLP

(57) ABSTRACT

In some embodiments, a method sends a playlist that includes links to segments of media content. At least a portion of the links include a variable, and a presentation of the media content that is attributable to a request for the media content is created by insertion of values for variables in the playlist. The values are associated with a first version of the media content or a second version of the media content. The method receives a request for a segment and the request contains information from a link included in the playlist. The information includes data based on a value provided for insertion into the link as a substitution for a variable included in the link. The value is associated with the first version of the media content or the second version of the media content. The segment that corresponds to the link is sent.

23 Claims, 9 Drawing Sheets

(56) References Cited

U.S. PATENT DOCUMENTS

| | | | | |
|---|---|---|---|---|
| 9,426,543 | B1 | 8/2016 | Li et al. | |
| 9,553,954 | B1 | 1/2017 | Akhter et al. | |
| 9,813,780 | B2 | 11/2017 | Sarda et al. | |
| 10,397,291 | B1 * | 8/2019 | Hall | H04L 65/70 |
| 11,284,139 | B1 | 3/2022 | Cava | |
| 11,451,863 | B1 | 9/2022 | Benjamin et al. | |
| 11,811,838 | B1 | 11/2023 | Brookins | |
| 2003/0217121 | A1 | 11/2003 | Willis | |
| 2010/0070628 | A1 | 3/2010 | Harrang et al. | |
| 2011/0270929 | A1 | 11/2011 | Harrang et al. | |
| 2012/0128332 | A1 * | 5/2012 | Spitzlinger | H04N 5/91 386/E9.011 |
| 2013/0054972 | A1 * | 2/2013 | Thorwirth | H04N 21/26258 713/176 |
| 2013/0142499 | A1 | 6/2013 | Major et al. | |
| 2013/0212231 | A1 | 8/2013 | Shi et al. | |
| 2014/0304373 | A1 * | 10/2014 | Tarbox | H04L 65/60 709/219 |
| 2015/0070516 | A1 * | 3/2015 | Shoemake | H04N 21/4542 348/207.11 |
| 2016/0373821 | A1 * | 12/2016 | Nair | H04N 21/8456 |
| 2017/0006318 | A1 | 1/2017 | Jennings et al. | |
| 2017/0208335 | A1 * | 7/2017 | Ramamurthy | H04N 19/156 |
| 2017/0289639 | A1 * | 10/2017 | Reisner | H04L 67/06 |
| 2018/0184160 | A1 | 6/2018 | Cain et al. | |
| 2019/0166170 | A1 * | 5/2019 | Ramaswamy | H04L 65/75 |
| 2019/0182494 | A1 * | 6/2019 | Li | H04N 19/521 |
| 2019/0297392 | A1 | 9/2019 | Farre Guiu et al. | |
| 2019/0356711 | A1 | 11/2019 | Choi | |
| 2020/0236409 | A1 | 7/2020 | Gordon | |
| 2022/0078496 | A1 | 3/2022 | Gordon | |
| 2022/0414676 | A1 * | 12/2022 | Power | H04L 63/18 |
| 2023/0038275 | A1 | 2/2023 | Fieldhouse et al. | |
| 2024/0121284 | A1 | 4/2024 | Brookins | |
| 2024/0364980 | A1 | 10/2024 | Linsey et al. | |

OTHER PUBLICATIONS

Pantos, R. Ed., HTTP Live Streaming 2nd Edition, 2021 IETF Trust; Retrieved from the Internet: https://datatracker.ietf.org/doc/html/draft-pantos-hls-rfc8216bis, 96 pages.

* cited by examiner

UNIQUE PLAYLIST CREATION USING VARIABLE SUBSTITUTION IN VIDEO DELIVERY

BACKGROUND

When a content delivery network delivers a video to a client device, the client device may request segments of the video for delivery. The segments may be portions of the video (e.g., five second portions of the video). In the video delivery process, a content delivery network may provide a media playlist to a client device that includes links to the segments of the video. The client device may use each link to request a respective segment of the video. The request may retrieve a segment from the content delivery network for delivery to the client device for playback.

In some scenarios, the content delivery network may provide a unique media playlist for a unique presentation of a video to a client. For example, the content delivery network may store two versions of a video. Then, the content delivery network generates a unique media playlist for a unique presentation of the video by generating a unique sequence of segments from the two versions. Each unique media playlist would have specific links to segments from the sequence of segments from the two versions. Generating unique media playlists for a large number of requests causes the content delivery network to manage and send a large number of unique media playlists. Also, in some cases, the generation uses computing resources to generate the unique media playlists and storage to store each unique media playlist.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
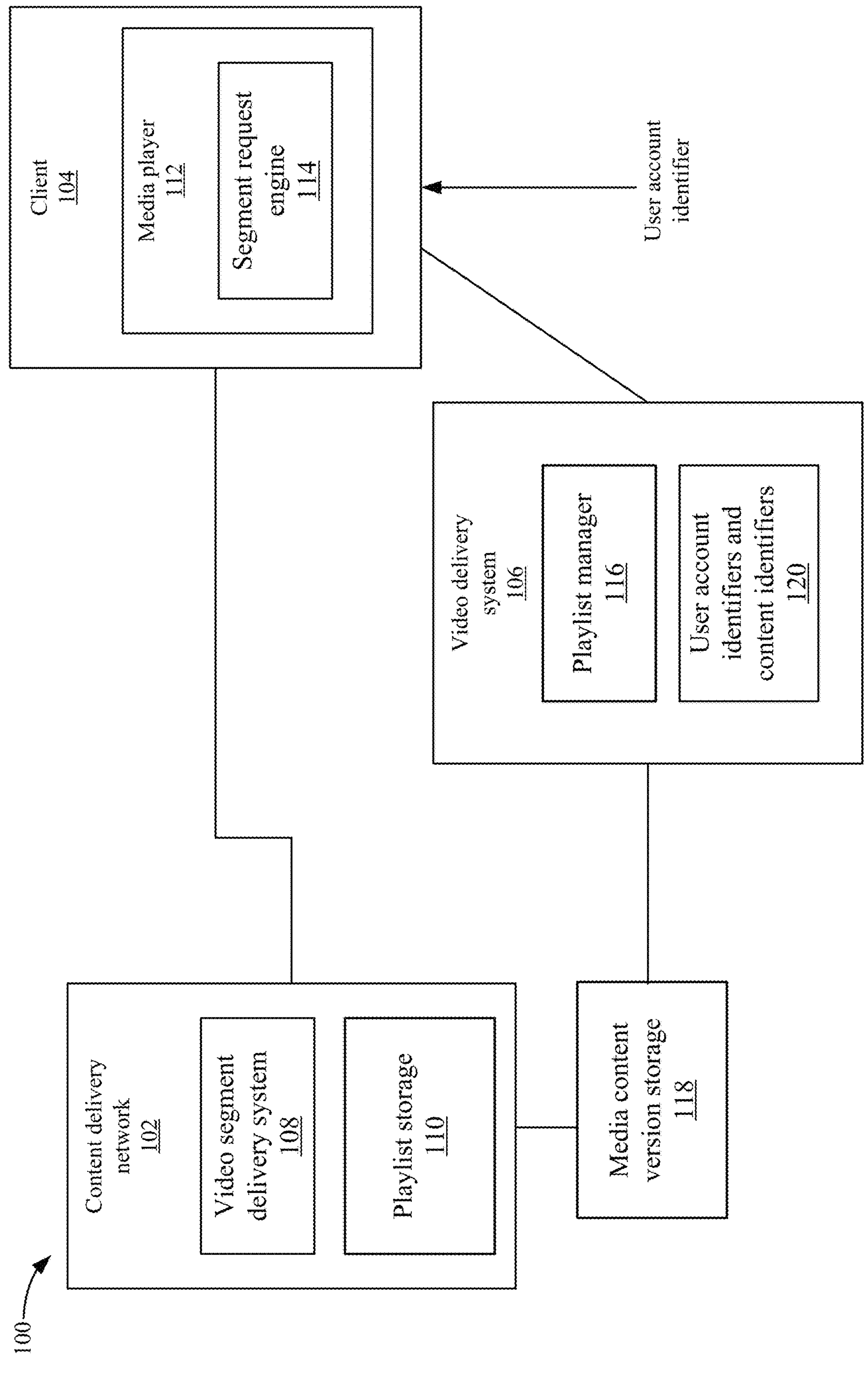
FIG. 1 depicts a simplified system for delivering media content with a unique playlist according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

In some embodiments, a content provider provides media content that can be delivered using a protocol, such as HTTP Live Streaming (HLS). Although HLS is discussed, other protocols may be used, such as Dynamic Adaptive Streaming over HTTP (DASH) or another delivery method. A protocol may define information that is sent between a server and a client to have media content delivered. In the following description, terms, such as playlists, may be used; however, other terms may be used that may perform similar functions or send similar information. For example, DASH may use manifests to send links to segments of media content. As will be described in more detail below, the process may use a multi-variant playlist that references the variants for the media content. The variants may be different variations of the video, such as different bitrates or resolutions. Once a variant is selected, the protocol uses a media playlist that lists links to segments that a client can request for playback. Accordingly, the multi-variant playlist may list the variants while the media playlist lists the segments that are available for the media content. Although the use of a multi-variant playlist and a media playlist is described, other methods of delivering the media content may be appreciated.

In some embodiments, a content provider may operate a video delivery system that causes delivery of a presentation of media content that is attributable to a request (for example, a request with specific characteristics such as originating from a particular source or region, a request associated with an individual requester, or an individual request). The presentation may be segments of content that form a unique presentation of the media content. The unique presentation may include at least one different segment version from any other presentation that is generated for the media content. The media content may be different information, such as video, audio, or other type of content that can be played on a media player or otherwise rendered via a computing device. Then, the video delivery system may allocate entropy slots in the media content that may introduce entropy in the presentations. For example, the number of unique presentations that can be supported may be 2^entropy slots. That is, ten entropy slots support $2^{10}$=1,024 unique presentations, twenty entropy slots support 2 20=1, 048,576 unique presentations, 30 entropy slots support $2^{30}$=1,0173,741,824 unique presentations, and so on. Slots may correspond to where segments of the media content can be delivered. Entropy in a slot is where one of multiple versions of the media content may be delivered in that slot. For example, if the media content includes an A version and a B version, the versions that are delivered in the entropy slots may be varied to create a unique presentation of the media content. Slots that are not designated to include entropy may not vary the version, such as the slot only plays a segment from one of the versions.

To generate the unique presentations, the video delivery system may generate multiple copies, such as duplicate copies, of media content. The duplicate copies may be referred to as an A version and a B version, but more than two copies may be generated. The A version may be the full version of the media content and the B version may be an alternative version of the media content. The B version may include X number of segments from the video that correspond to the number of entropy slots. For example, the B version may include 24 segments or 32 segments, but may include different numbers of segments up to the full version of the media content. The video delivery system may send a unique sequence of segments from the A version and the B version to a client while playing back the media content. For example, 24 segments of media content may include a unique sequence of segments from the A version or B version of the media content. The other segments in the media content may be from one version, such as the A version. By varying the 24 segments of the media content from either the A version or the B version, the video delivery system can create a unique presentation of the media content for a request.

To improve the delivery of the unique presentations of media content, the video delivery system may use variable substitution in a playlist, such as the media playlist, that is provided to the client. As will be described in more detail below, a variable may be included in links for segments of the media content in the playlist, such as variables of $s1, $s2, $s3, etc. When a client requests media content, the video delivery system may generate a unique sequence of segments from the A version and the B version. Then, the video delivery system may define the values of the variables according to which version of the video should be sent for each of the unique sequence of segments. For example, for a segment S1 that is associated with a link with the variable $s1, the video delivery system may determine that the A version of segment S1 should be sent; for a segment S2 that is associated with a link with the variable $s2, the video delivery system may determine that the B version of segment S2 should be sent; for a segment S3 that is associated with a link with the variable $s3, the video delivery system may determine that the B version of the segment S3 should be sent; and for a fourth segment S4 that is associated with a link with the variable $s4, the video delivery system may determine that the B version of the segment S4 should be sent. In this example, the unique portion of the video stream may be a unique segment sequence of "ABBB" that would be contained within a sequence of segments from the A version both before and after the unique segment sequence provided at a predetermined location within the stream. For example, in this situation, the full stream for the content may be in the format: "A . . . AAAAAAABBBAAAAA . . . . A" with the bold portion of the stream indicating the portion containing the unique segment sequence. In some embodiments, the unique segment sequence may be provided at either the beginning or the end of the content stream.

In some embodiments, the unique sequence of segments may be spread throughout the entire stream, as opposed to being contained in a single portion of the content stream. Such a stream may appear as, for example: "ABAAAAA-BAABAAAAABAAAAABAABAB . . . ". The values for the unique sequence may be provided to the client, such as s1=0, s2=1, s28=1, s29=0, and s30=1, where s1, s2, etc. correspond to the variables in the links, and the value of "0" corresponds to the A version, and the value of "1" corresponds to the B version. Then, the client device may substitute the value for the variable in a link that is used to request the respective segments.

The use of the variable substitution may allow a single media playlist to be used for multiple requests in which unique presentations should be used. The single media playlist includes variables for the segments in which a unique sequence should be generated. Using a single media playlist in response to all requests for an instance of content, instead of creating unique media playlists for each unique presentation may simplify the playback process because a single media playlist is sent instead of multiple unique media playlists. Also, instead of storing media playlists for each unique presentation that is generated, the video delivery system may only need to store the media playlist that includes the variables included in the links. Then, the video delivery system may determine a unique set of values to be substituted for the variables by the client. The video delivery system may store the values that are used for a specific request of media content. Also, if a defined process is used to generate the values for the variables, such as using a combination of a user account identifier and a content identifier, then the video delivery system may be able to determine the values that were used for the variables upon receiving the user account identifier and the content identifier, and does not need to store the values that were used for the variables. Either method may reduce the amount of storage that is required.

System Overview

FIG. 1 depicts a simplified system 100 for delivering media content with a unique playlist according to some embodiments. The media content may include different types of media content, such as video, audio, or other types of content information. Video may be used for discussion purposes, but other types of content may be appreciated.

System 100 includes a content delivery network (CDN) 102, a client 104, and a video delivery system 106. A content provider may operate a video delivery system 106 may provide a video delivery service that allows entities to request and receive media content, such as on-demand videos and live videos, from a library of media content. The media content may be programs, such as movies, shows, advertisements, etc. However, as discussed above, media content may be different types of content. The content provider may use video delivery system 106 to coordinate the distribution of media content to clients 104.

Content delivery network 102 may deliver the media content for the video delivery service. Content delivery network 102 may include one or more computing devices, such as servers, that deliver media content to client 104. A content provider may operate its own content delivery network, in addition to contracting with multiple third-party content delivery networks to assist in the delivery of its media content to clients 104. Although an instance of content delivery network 102 is shown and an instance of client 104 is shown, one or more instances of content delivery network 102 may be delivering media content to one or more instances of clients 104. Also, content delivery network 102 may include multiple computing devices, such as an origin server that may store the media content, and edge nodes, which may be geographically distributed. The edge nodes may receive segments of the media content from the origin server and deliver the segments to different clients 104. Any server associated with content delivery network 102 may perform the functions described herein. Also, although a video delivery system 106 and content delivery network 102 may be described, functions performed by either may be distributed between the two entities, or performed by other entities.

Content delivery network 102 may include a video segment delivery system 108 that delivers segments of media content to client 104. A segment of media content may be a portion of media content, such as around five seconds of video, and the media content may include multiple segments.

Client 104 may include different computing devices, such as smartphones, living room devices, televisions, set top boxes, tablet devices, etc. Client 104 includes a media player 112 that can play a video. In some embodiments, media player 112 receives segments of media content and can play these segments. A segment request engine 114 may send segment requests to content delivery network 102, and then receive the requested segments for playback in media player 112.

Identities may be used to define who sends a request for media content. The identities may include user account identifiers, client identifiers, or other identifiers. Video delivery system 106 may assign identities that identify a user account, such as user account identifiers that are associated with user accounts that use the video delivery service. The user accounts may be associated with users and the user account identifiers are used to access the video delivery service using client 104. The user account identifier may uniquely identify the user account among user accounts being used by video delivery system 106. Client 104 may receive a user account identifier when a user account uses the video delivery service. For example, when the user account logs into the service, the application is sent the user account identifier or has stored the user account identifier for the user account. Also, the identities may be associated with clients 104 that use the video delivery service, such as each client 104 may be assigned a unique client identifier (e.g., a network address, IP address, MAC address, etc.). Although user account identifiers and client identifiers are discussed, other types of identity information may be appreciated, such as media players may be assigned identities.

Video delivery system 106 may include storage 120 that stores user account identifiers and content identifiers. Content identifiers may identify media content that can be sent to clients 104. As will be discussed in more detail below, video delivery system 106 may use identity information, such as the user account identifier and a content identifier, to identify a sequence of segment versions that are sent for media content to client 104. Although the user account identifier and the content identifier are used, other information may be used, such as a combination of the user account identifier, client identifier, and content identifier.

In some examples of a general playback process, video delivery system 106 may provide a link to a first playlist to client 104. Client 104 may use the link to request the first playlist from content delivery network 102, and then client 104 receives the first playlist from content delivery network 102. The first playlist may be a multivariant playlist, that lists variants that are available for the media content. For example, a variant may include different characteristics, such as the variants may be encoded using different bandwidths, resolutions, encoders, etc. In some examples, the variants include multiple bitrates, such as 1000 Megabytes per second (Mbps), 1500 Mbps, etc. Client 104 may select a variant based on different conditions. For example, client 104 may request one of the variants based on the conditions being experienced during playback, such as available bandwidth. That is, client 104 may request a variant that was encoded at a lower bitrate if the available bandwidth is lower and a variant with a higher encoded at a higher bitrate if the available bandwidth being experienced during playback is higher.

Once client 104 selects a variant, client 104 requests a media playlist for the variant and receives the media playlist from content delivery network 102. The media playlist includes information that can be used to have segments delivered to client 104 to playback the media content on media player 112. The information may be links (e.g., Uniform Resource Locators) that identify the segments. In some embodiments, portions of the media playlist may be sent over time as the content is delivered and played back. For example, a first media playlist is sent with links to segments 1-3. Then, a second media playlist is sent with links to segments 4-6, etc.

To provide unique presentations, video delivery system 106 may store the different versions of the media content in media content version storage 118. Content delivery network 102 may retrieve the segments from storage 118 when needed. The media content may include segments, such as 1000 segments that are around five seconds each. In some embodiments, an A version and a B version may be used. The A version may store the 1000 segments of the media content. Then, at least a portion of the segments of the media content may be selected as segments that could include a B version. Then, those segments are stored as another version, such as a B version. The media content may include multiple versions that each include the same (or similar) content of the video. The same content may be the same original content. Some variations may be introduced in different versions, such as different watermarks may be included in different versions. In some embodiments, video delivery system 106 may select which segments should be included in the B version. For example, 24 segments or 32 segments of the media content may be stored as the B version. That is, not all segments of the media content in the A version may be stored in the B version. Also, video delivery system 106 may select the position of the B segments from within the media, such as the last 24 segments of the media content are selected, segments in the middle of the media content, random segments, etc. Also, in other embodiments, all segments may be replicated from the A version to the B version. The identification and generation of segments for the B version may be described in more detail in U.S. application Ser. No. 17/938,297 entitled "GENERATION OF UNIQUE PRESENTATION OF MEDIA CONTENT", filed concurrently, the content of which is incorporated by reference in its entirety.

As will be discussed below, the 24 corresponding A version segments and B version segments may be varied in a media playlist that is sent to client 104 to create a unique presentation of media content. For example, if 24 entropy slots are being used, the segments that are sent to create a unique presentation may include a sequence of an A segment, a B segment, an A segment, a B segment, etc. up to the 24 segments To create another unique presentation, the segments that are sent to client 104 in the entropy slots may be an A segment, an A segment, a B segment, a B segment, etc. up to the 24 segments. Thus, the unique presentations may include the different sequence of A version and B version segments of "AAAAAAAAAABAABAAAAA-BAAAAAABAB" and "AAAAAAAAAAABAA-BAAAAABAAAAAAABB", respectively, within the unique presentations of the media content. In the last four segments, the difference between the first unique presentation and the second unique presentation is "ABAB" and "AABB" at the ends of the presentations.

Playlist manager 116 may use variable substitution to provide the unique playlist to client 104. For example, a media playlist may include variables in the links that are provided for the media content. The variables may be the same for media playlists that are sent for multiple unique presentations that are provided. Accordingly, the same media playlist may be stored in playlist storage 110 and provided for multiple requests. Playlist manager 116 may generate values for the variables for a request that is received to generate a unique presentation of media content.

The values for the variables may be generated in different ways. In some embodiments, playlist manager 116 may generate the values in real-time when a request is received. However, the values may also be pre-generated. As will be discussed in more detail below, playlist manager 116 may determine the sequence of segments from the A version and the B version based on input that may be unique to the request for the media content. For example, the input may be a user account identifier and a content identifier for the media content that has been requested. However, other inputs may be used, such as a client identifier. The content identifier and the user account identifier may be translated into a unique request identifier (ID), such as using a predictable algorithm (e.g., a hash algorithm) that outputs the same output for the same input. For example, a hash of the content identifier and the user account identifier may yield a hash code, which may be a series of values, such as "0" and "1" values for the entropy slots. For example, the unique request ID may be "0101 . . . 01". The number of values in the series may equal the number of entropy slots Each value may correspond to a segment in the media content and represent which version is associated with the segment. For example, the first value of "0" may indicate segment 191 is associated with version A, the second value of "1" indicates segment 192 is associated with version B, etc. Padding or truncating of the hash may be performed to make the unique request ID equal to the number of entropy slots in the media playlist that could be from either the A version or the B version. Also, the unique request ID may be generated in other formats that could specify which version a segment should be assigned. Slots other than the entropy slots may be assigned a fixed version, such as the A version. While the unique request ID may be associated with the entropy slots, a larger ID for the media content may be used. However, the slots outside of the entropy slots would be fixed to the same version for multiple unique presentations, such as slots 1-130 always receive a segment from version A.

Playlist manager 116 may generate a sequence of segments from the A version and the B version based on the unique request ID. For instance, a 0 value may correspond to the A version, and a 1 value may correspond to a B version. Accordingly, when one of the segments that should be uniquely presented to client 104 is encountered, a corresponding value in the unique identifier is used to determine which segment should be provided to client 104. For example, if the unique identifier is "0101", then the portion of the entropy slots have the first segment from the A version, the second segment from the B version, the third segment from the A version, and the fourth segment from the B version. Although the above method of generating the unique request ID is discussed, other methods may be used, such as using pre-generated unique request IDs that are assigned per request.

After generating the values of the variables, playlist manager 116 may send the values to the client device using one or more of a number of different methods described herein. For example, video delivery system 106 may receive a request for media content. Then, playlist manager 116 may send the unique request ID in a link for a multivariant playlist to client 104. Client 104 uses the link to request the multi-variant playlist from content delivery network 102. Content delivery network 102 may use the unique request ID to determine the values for the variables. Then, content delivery network 102 provides the values for the variables to client 104, such as using a parameter in the multi-variant playlist. An example of the multi-variant playlist will be described below. When a variant is selected by client 104, content delivery network 102 provides the media playlist with the variables. Then, when a variable is encountered in a link to a segment in the media playlist, segment request engine 114 in client 104 may then substitute the value in the link in the media playlist when requesting respective segments. Although the above process is described, other processes may be used. For example, client 104 or content delivery network 102 may generate the unique request ID. Also, content delivery network 102 may send the unique content ID to client 104 instead of playlist manager 116.

Using variable substitution provides many advantages. For example, a single media playlist may be used for the media content. Then, each client 104 may substitute a respective value for a variable in links for the segments. This creates a unique media playlist and unique presentation for the request. As discussed above, content delivery network 102 or video delivery system 106 does not need to generate or store multiple unique media playlists for each request. Also, the unique request ID that is used to generate the unique presentation may not need to be stored because the unique request ID may be generated based on known input, such as the user account identifier and the content identifier.

The following will now describe the delivery of the unique presentation of media content in more detail starting with the version creation process and then the playback process.

Version Creation

Figure 2:
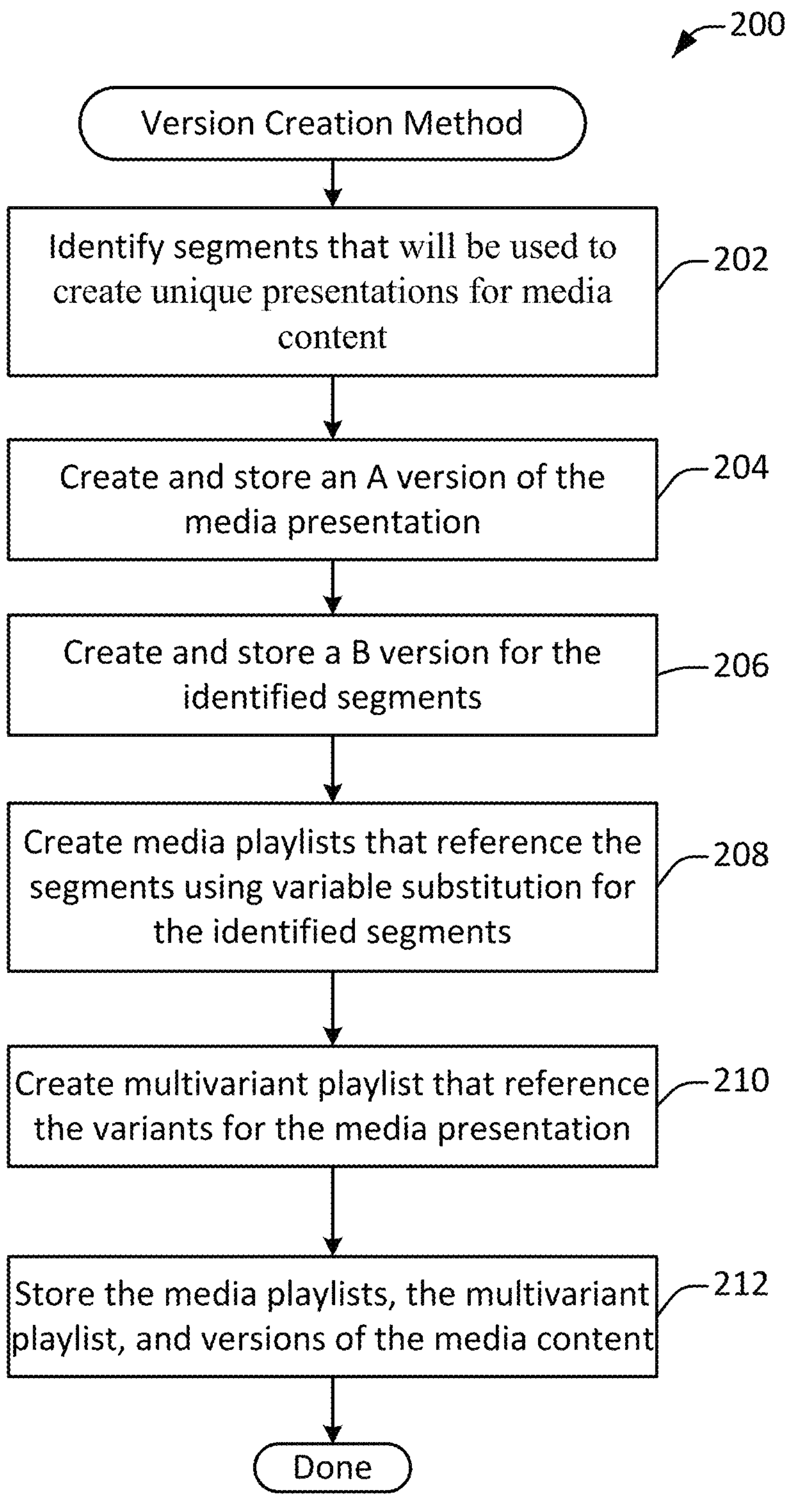
FIG. 2 depicts a simplified flowchart for creating versions of media content and playlists according to some embodiments.

FIG. 2 depicts a simplified flowchart 200 for creating versions of media content and playlists according to some embodiments. At 202, video delivery system 106 may identify segments that will be used to create unique presentations for media content. That is, entropy slots (e.g., indicating positions of segments within a stream) will be designated as positions to be used to create a unique presentation by being filled with segments selected either from the A version or the B version. As discussed above, 24 segments may be identified as segments that would be used to create a unique presentation. In some embodiments, 24 segments would allow for 16,777,216 unique combinations of presentations of the media content. In this case, 16,777,216 unique presentations of the media content may be delivered to 16,777,216 unique user accounts.

At 204, video delivery system 106 may create and store an A version of the media content. The A version of the media content may be the full version of the media content including all the segments of the media content. At 206, video delivery system 106 may create a B version for the segments that were identified in 202. The B version of the segments may include the same or similar content as corresponding segments in the A version. For example, the B version may be copied from the A version. In some examples, additional content may be added to the B version, such as a watermark or other symbol. The B-version of the segments may be created in such a way that it is transparent to a viewer of the requested content whether an A segment or a B segment is being played out by the media player 112. Also, the B version may be named differently. For example, the file name or directory path may be different for the B version segments. In some embodiments, the B version includes segments corresponding to all of the segments in the A version, while in other embodiments, the B version may contain only segments corresponding to a subset of the segments contained in the A version. In the former case, step 206 may be a simple duplication of the A version, without reference to the identified segments in 202 or all segments may be identified in 202, such as by an identification of copying the entire A version. In the latter case, the subset of segments may correspond to the set of segments (segment positions) identified in 202 as being used to create the unique presentation. An example of the stored segments for the A version and the B version will be described in FIG. 3.

At 208, video delivery system 106 creates one or more media playlists that reference the segments where variable substitution is used for the identified segments from 202. The media playlists may include information that enables the one or more segments of the media content to be requested. When a segment that has been identified as unique is encountered, video delivery system 106 inserts a variable in the information for the segment. A media playlist may list segments for only a portion of the media content. For example, a media playlist may list three segments each, such as a first media playlist lists segments 1-3, a second media playlist lists segments 4-6, and so on. Depending on which segments are being requested, some media playlists may not include variables in links. For example, a first media playlist for segments 1-3 may include links for segments in version A and no variables. However, a second media playlist for segments 997-1000 may include links with variables. An example of a media playlist will be described in FIG. 4A.

At 210, video delivery system 106 creates a multi-variant playlist that references the variants for the media content. The multi-variant playlist may list the variants while the media playlist listed the segments that are available for the media content. An example of a multi-variant playlist is described in FIG. 4B.

At 212, video delivery system 106 stores the media playlists, the multi-variant playlist, and versions of the media content. For example, video delivery system 106 may communicate the media playlist and the multi-variant playlist to content delivery network 102 for storage in playlist storage 110. Also, the versions of the media content may be provided for storage in media content version storage 118.

Figure 3:
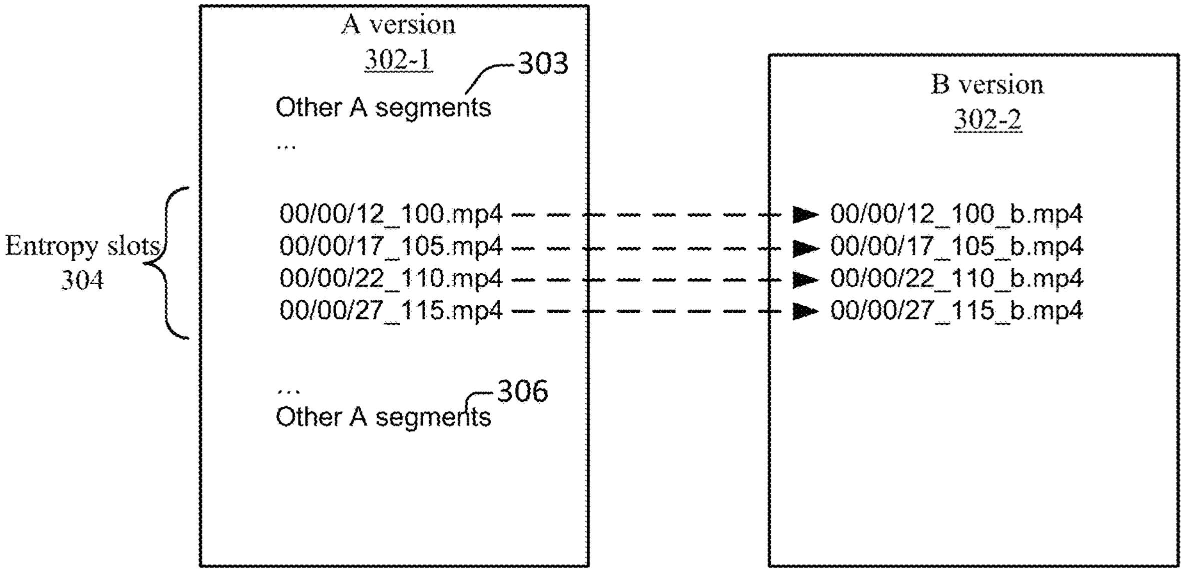
FIG. 3 depicts an example of an A version and a B version of media content according to some embodiments.

FIG. 3 depicts an example of an A version 302-1 and a B version 302-2 of media content according to some embodiments. At 303 and 306, other A segments are stored in A version 302-1. The other A segments are not in entropy slots in that these segments are always sent when the media content is requested. Entropy slots 304 are where a set of segments may be selected from the A version or the B version to generate a unique presentation for the media content. As shown, four entropy slots 304 are provided, but there may be other amounts of entropy slots, such as 24 entropy slots.

To create B version segments, video delivery system 106 may create a copy of the segments in the A version that correspond to entropy slots 304. Then, video delivery system 106 may change information for the segment, such as the file name to be different than information for the A version. In this example, an extension of "b" is added to the end of the file name, but other methods may be used to distinguish the segments in the B version from the A version, such as adding an "_a" to the segments in A version 302-1 that are found in entropy slots 304. For example, an A version of a segment is stored with a file name of "00/00/12_100.mp4", and the B version of the segment may be stored with a file name of "00/00/12_100_b.mp4". Similarly, the file name of other segments is changed to include the extension of "_b" at the end of the file name. Other methods may also be used to create segments for the B version, such as having unique directory paths for the A version and the B version.

In some embodiments, the B version of the media content does not include the other A segments that are found in the A version at 303 or 306. That is, the only segments included in the B version are corresponding B version segments for entropy slots 304. This reduces the amount of storage that is used for the B version compared to storing B-version segments corresponding to all of the A segments in the B version. However, all the segments of the A version of the media content could be copied to the B version.

Figure 4A:
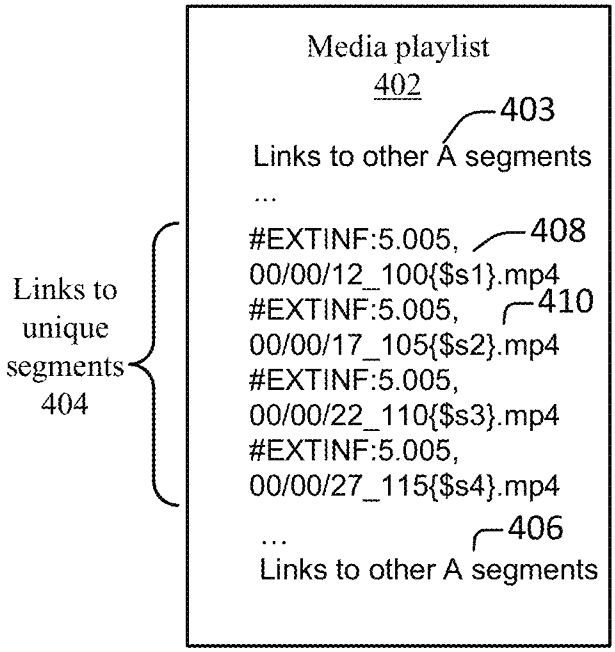
FIG. 4A shows an example of a media playlist according to some embodiments.

FIG. 4A shows an example of media playlist 402 according to some embodiments. Although one media playlist 402 is described, multiple media playlists 402 may be used, and this example is described for discussion purposes. Media playlist 402 may be provided for multiple requests when an instance of media content is requested. A media playlist that specifies the version of segments in the unique sequence of segments does not need to be provided to service multiple requests even when unique presentations of media content will be provided. This is because variable substitution is used to generate the unique media playlists during the playback process.

Media playlist 402 includes links that can be used to request segments for the media content. At 403 and 406, links to other A segments are included. The links are information that can be used to identify the segments that are stored in A version 302-1 in FIG. 3. At 404, the media playlist includes links to the segments in the entropy slots. The links to the segments in the entropy slots include a variable that is designated as {s #}, where # is a number. For example, for the four segments in the entropy slots, the four variables are $s1, $s2, $s3, and $s4, respectively. For the first segment, at 408, the variable is $s1 in the link 00/00/12_100{$s1}.mp4. For the second segment, at 410, the variable is $s2 in the link 00/00/17_105{$s2}.mp4. The third segment includes a variable $s3 and the fourth segment includes a variable $s4.

A client 104 or content delivery network 102 may dynamically substitute the variable value in the links when requesting the segments during playback. It will be assumed that client 104 performs the substitution, but content delivery network 102 or another entity may perform the substitution. The values for the variables in the links may be provided to client 104 in different ways. For example, a multi-variant playlist may include the variable values. However, the variable values may be provided in other ways, such as content delivery network 102 or video delivery system 106 may send a file with the variable values separately, or the variable values may be included in media playlist 402.

Figure 4B:
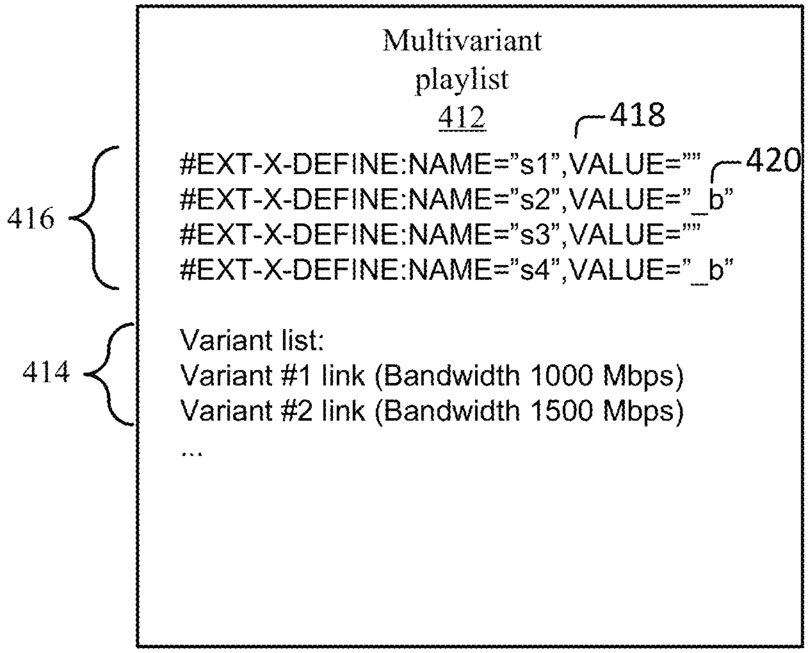
FIG. 4B depicts an example of a multi-variant playlist according to some embodiments.

FIG. 4B depicts an example of a multi-variant playlist 412 according to some embodiments. As discussed above, multi-variant playlist 412 may include links to a list of variants that can be requested by client 104. At 414, a variant list includes a variant #1 link and a variant #2 link, etc. The difference between variant #1 and variant #2 may be variant #1 is encoded at a bandwidth of 1000 Mbps, and variant #2 is encoded with a bandwidth of 1500 Mbps.

Multi-variant playlist 412 also includes the variable values at 416. For example, a feature may be used to define the values. In some embodiments, the feature may allow the definition of values for variables in multi-variant playlist 404. For example, the feature may be an EXT-X-define feature in the HLS protocol, but features other than EXT-X-define may be used to send the variable values. Also, other protocols may include other features that provide similar functionality.

Each statement may include the name of the variable and the assigned value of the variable. For example, at 418, the name of the variable is s1 and the value is " " (e.g., null). Also, at 420, the name of the variable is s2 and the value is "b". Accordingly, the value of s1 is no value, which may substitute no value in the link at 408, in which case the link corresponds to the A version of the segment 00/00/12_100.mp4. Also, instead of a null value, the A version may be identified by an extension, such as "_a", and the value for s1 may be "_a". When the variable s2 is equal to the value "_b", the second link at 410 in FIG. 4A becomes 00/00/17_105_b.mp4. This link corresponds to the B version of the media content. Similar substitutions may occur for the third link with the variable s3 and a fourth link with a variable s4. In this example, the unique sequence of segments may be "ABAB", which corresponds to an A version segment, a B version segment, an A version segment, and a B version segment. Accordingly, the multivariant playlist 412 may be different for each unique presentation of media content that is sent, but the media playlist is the same. The management of media playlists is simplified because content delivery network 102 does not need to manage multiple versions of media playlists.

Playback Process

Figure 5:
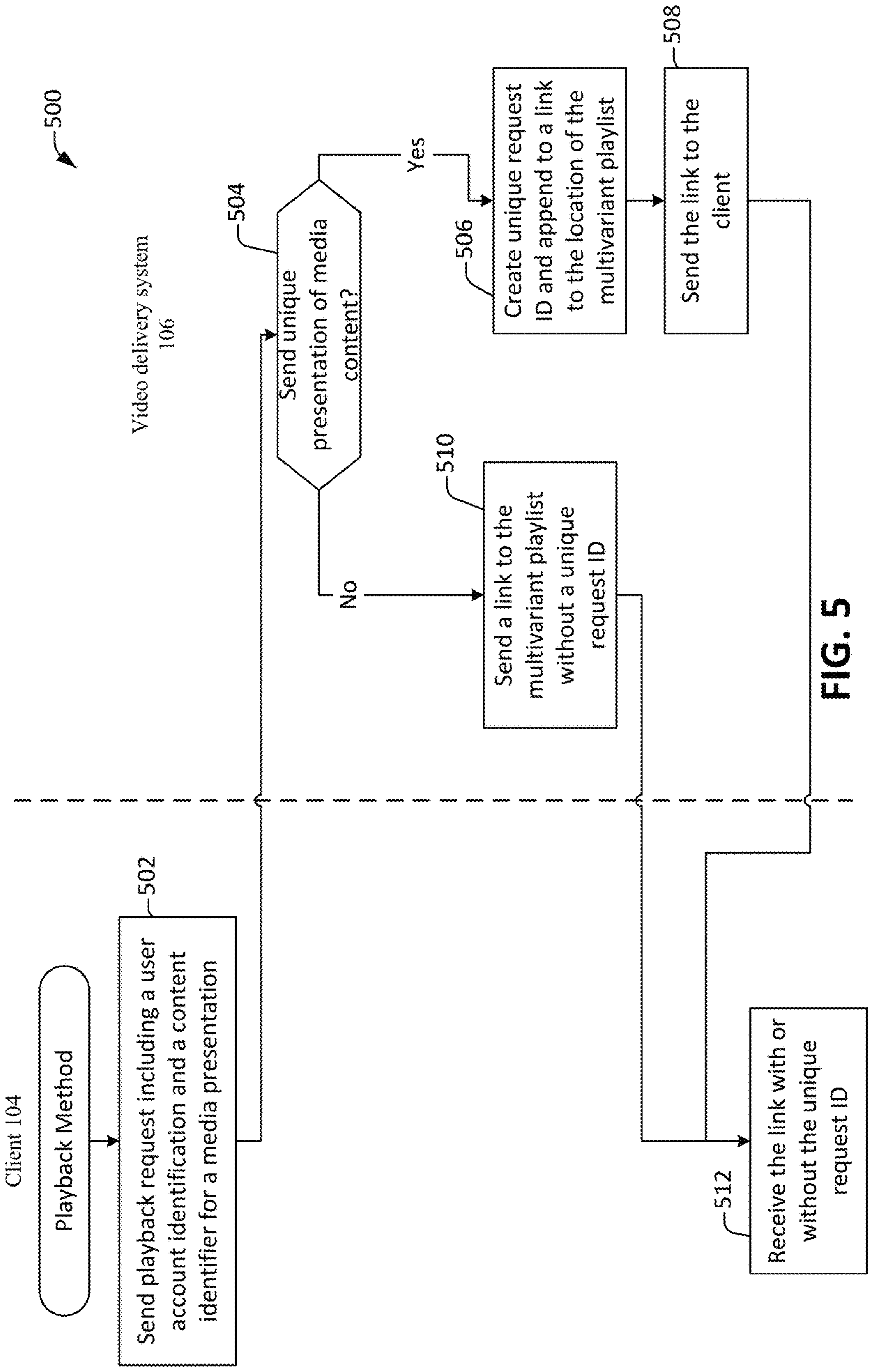
FIG. 5 depicts a simplified flowchart of the playback process from the perspective of a client and a content delivery network according to some embodiments.
Figure 6:
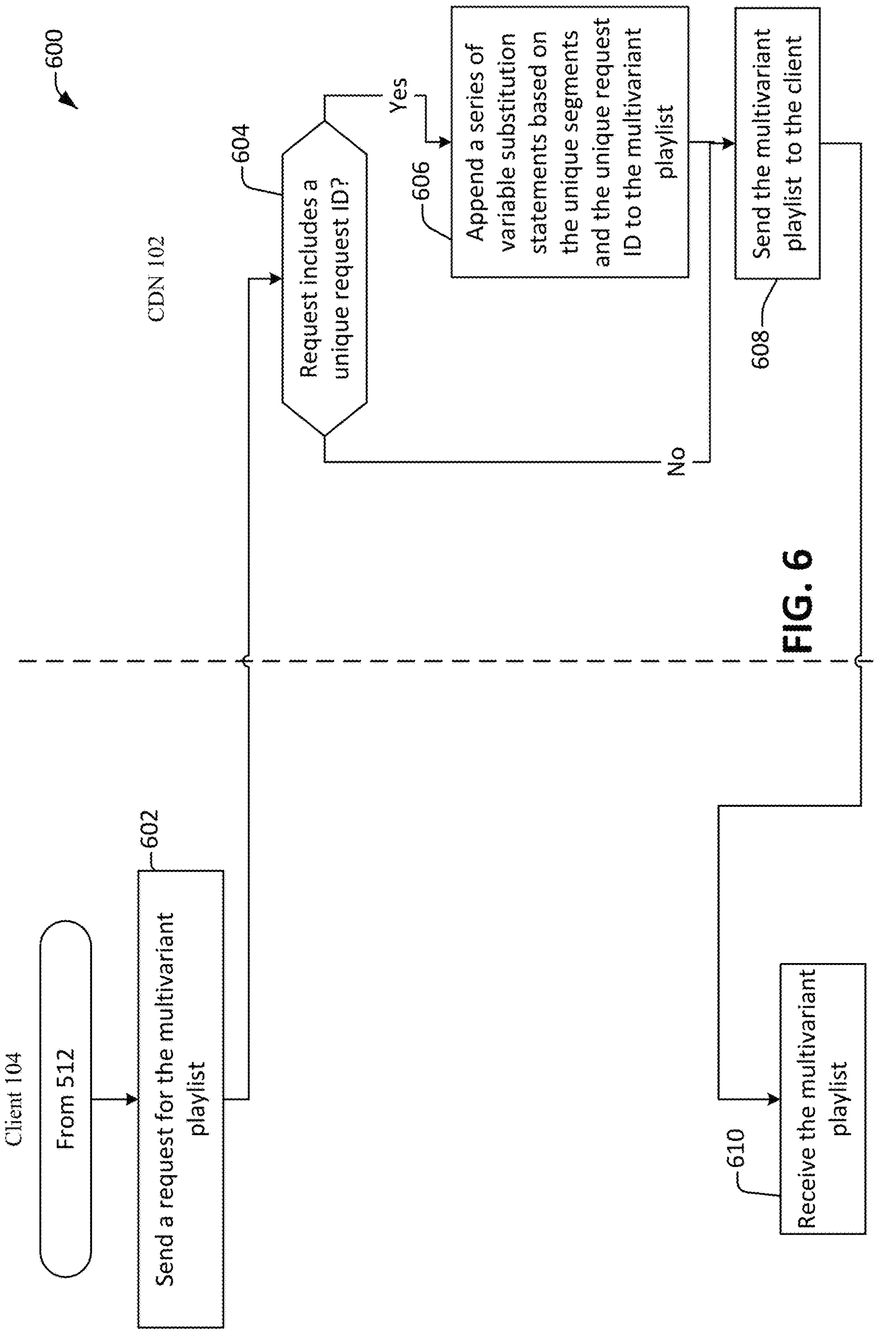
FIG. 6 depicts a simplified flowchart of a method for requesting the multi-variant playlist according to some embodiments.
Figure 7:
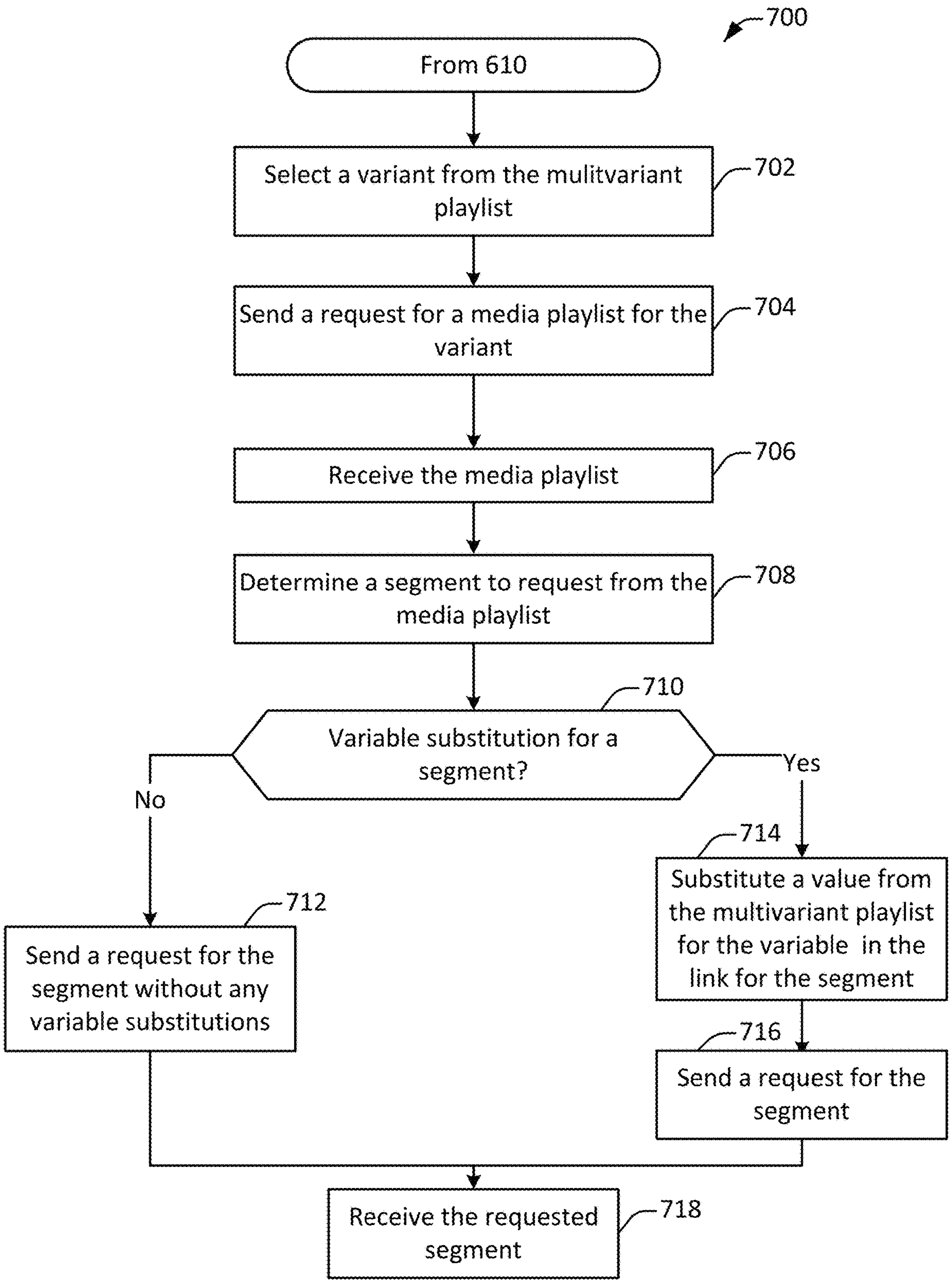
FIG. 7 depicts a simplified flowchart for requesting and receiving a segment at the client after receiving the multi-variant playlist according to some embodiments.

The following will now describe the playback process. FIGS. 5-7 depict different aspects of the playback process including processing a request for media content, using the multivariant playlist, and using the media playlist during the playback process according to some embodiments. FIG. 5 depicts a simplified flowchart 500 of the playback process from the perspective of client 104 and video delivery system 106 according to some embodiments. At 502, client device 104 sends a playback request for media content. The request may include information that can be used to determine a unique presentation of the media content. For example, the information may be a user account identifier and a content identifier for the media content.

There may be multiple different scenarios in which it may be useful to respond to a request for media content by client 104 with a copy of the content that is unique to the client or to the request. In some content request scenarios, a unique presentation of the media content may not be required. That is, in some of the scenarios, a unique presentation of the media content may be provided, and in other scenarios, a non-unique copy may be provided. For example, in scenarios where copy protection/anti-piracy/confidential disclosure is a concern, providing a unique copy is useful to track any subsequent unauthorized distribution and trace it back to the original requester (e.g., a user account or client 104). In this scenario, the unique copy functions as a "digital watermark" for purposes of identifying duplicates of the unique version. In addition to the unique version of the requested content itself serving as a digital watermark, further digital watermark data may be embedded on segments that are sent to client 104 to create a further way to uniquely identify the media content that is received by client 104. In other scenarios, it may be useful to provide a unique version of the requested content in response to a request by client 104 to stream a piece of content that a user previously designated to be saved or recorded from a broadcast of the underlying content on a linear network or similar broadcast. A linear network is a broadcast network such as an over-the-air, cable, or satellite broadcast of scheduled programming. In addition to the foregoing scenarios, the method may be used for any other scenario in which a unique copy is desirable to be provided in response to a client request for content.

At 504, video delivery system 106 determines whether a unique presentation of the media content should be sent to the user account. If a unique presentation of the media content is required, at 506, content delivery network 102 creates information that could be used to perform variable substitution and sends the information to client 104. For example, the information may be the unique request ID, which may be a representation of the information unique to the request, such as a hash of a combination of the content identifier for the media program and the user account identifier for the user account.

Once the unique request ID is generated, video delivery system 106 may send information for the unique request ID to client 104. For example, video delivery system 106 may append the unique request ID to a link of the location of the multi-variant playlist. The link of the location of the multi-variant playlist allows client 104 to request and receive the multi-variant playlist. In some embodiments, there may be different methods of appending the unique request ID to the location of the multi-variant playlist. For example, if a link to the multi-variant playlist is used, such as a uniform resource locator location, the unique request ID may be appended as a parameter, such as a query parameter, in the link. The unique request ID may also be sent using other methods, such as separately from the link of the location of the multi-variant playlist.

At 508, video delivery system 106 sends the link to client 104. The appending of the unique request ID to the link to the multi-variant playlist may be used to indicate to content delivery network 102 that a unique presentation of the media content is required because content delivery network 102 may process requests to the link to the multi-variant playlist. That is, a request using the link goes to a server in content delivery network 102. This allows a stateless process to be used in that content delivery network 102 does not need to store state that a request requires a unique presentation of the media content. That is, when content delivery network 102 receives a link for the multivariant playlist that includes a unique request ID, content delivery network 102 knows that this request is for a unique presentation of the media content. However, video delivery system 106 could communicate with content delivery network 102 to indicate when to use a unique presentation of the media content.

If a unique presentation of the media content is not needed, at 510, video delivery system 106 sends a link to the multi-variant playlist without information that could be used to perform variable substitution. At 512, client 104 receives a link of the location of the multi-variant playlist, which may or may not include the unique request ID.

FIG. 6 depicts a simplified flowchart 600 of a method for requesting the multi-variant playlist according to some embodiments. After receiving the link of the location of the multi-variant playlist, at 602, client device 104 sends a request for the multi-variant playlist. If a unique presentation of the media content is being provided, the request includes the unique request ID. For example, the unique request ID is included in the link that is used to request the multi-variant playlist. If a non-unique presentation of the media content is provided, then the request for the multi-variant playlist may not include the unique request ID.

At 604, content delivery network 102 determines if the request includes a unique request ID. If the unique request ID is included in the request, at 606, content delivery network 102 appends statements that can be used to perform variable substitution to the multi-variant playlist, such as a series of variable substitution statements that have values for variables. For example, content delivery network 102 uses the unique request ID to determine values for the variables, such as the unique request ID may include a series of "0" and "1" values, or the unique request ID can be translated into information that can identify the A version and the B version for segments. Content delivery network 102 may determine corresponding values from the unique request ID to values for the specific variables. For example, the unique request ID may be "1011", which may correspond to s1=1, s2=0, s3=1, and s4=1. Other methods of determining the values of the variables from the unique request ID may be used. In some examples, the statements at 408 in FIG. 4B are appended to the multi-variant playlist. At 608, content delivery network 102 sends the multi-variant playlist to client 104. If the request did not include a unique ID, the multi-variant playlist without the statements for the variable values may be sent to client 104. Then, at 610, client 104 receives the multi-variant playlist.

FIG. 7 depicts a simplified flowchart 700 for requesting and receiving a segment at client 104 after receiving the multi-variant playlist according to some embodiments. At 702, client 104 selects a variant from the multi-variant playlist. For example, client 104 may review the variants and select one of the variants from the multi-variant playlist. In some embodiments, a variant that has characteristics based on current playback conditions may be selected. In some examples, if the available bandwidth is around 1,000 Mbps, client 104 selects a variant that is encoded around 1,000 Mbps.

At 704, client 104 sends a request for a media playlist for the variant. For example, client 104 sends a request for the variant based on a link for the variant.

At 706, client 104 receives the media playlist that was requested. Assuming a unique presentation is requested, the media playlist may be based on the media playlist from FIG. 4A, which includes variables in which values can be substituted. If a unique presentation is not requested, a media playlist without variables may be received.

During playback of the media content, at 708, client 104 determines a segment to request from the media playlist. For example, as playback proceeds, client 104 may download segments for playback using the links in the media playlist. When a link is encountered, at 710, client 104 may determine if variable substitution is needed for the segment. If not, at 712, client 104 sends a request for the segment without any variable substitution. For example, this segment may be one of the segments in the media content that are not in an entropy slot, such as the other A segments at 303 or 306 in FIG. 3. Different methods may be used to request a segment using the link, such as using an HTTP GET request that uses information from the link to identify the segment that is being requested.

If variable substitution should be performed, at 714, client 104 substitutes a value for the variable from the multi-variant playlist for the variable in the link for the segment. For example, if the link for the segment is 00/00/12_1001$s11.mp4, client 104 may substitute the value of " " to generate the link of 00/00/12_100.mp4 (e.g., a request for the A version). Also, if the link is 00/00/17_1051$s21.mp4, client 104 substitutes the value "b" for variable s2 to generate the link 00/00/17_105_b.mp4 (e.g., a request for the B version).

At 716, client 104 sends a request for the segment using the link (e.g., using an HTTP GET request). Then, at 718, client 104 receives the segment. The segment may be a segment from the A version of the media content or the B version of the media content depending on whether variable substitution was used. The above process of requesting segments using links in the media playlist continues throughout the playback of the media content. The playback of segments creates a unique presentation of the media content when required. In some embodiments, not all of the segments of media content may be played back, such as playback may be stopped before all of the segments are delivered. Even though not all segments have been delivered, the unique presentation of the media content according to the unique request ID may be considered delivered for the request.

Accordingly, a single media playlist may be used and provided for multiple requests, such as to different user accounts and clients 104. However, clients 104 may use variable substitution to generate unique presentations of the media content for playback. The variables may be generated using a defined process, such as based on the user account identifier and content identifier. In this way, the unique request ID can be used to determine which unique presentation of the media content is sent to client 104. Using the variable substitution saves storing multiple copies of the media content for each unique presentation in addition to not having to send multiple media playlists for multiple requests for unique presentations.

System

Figure 8:
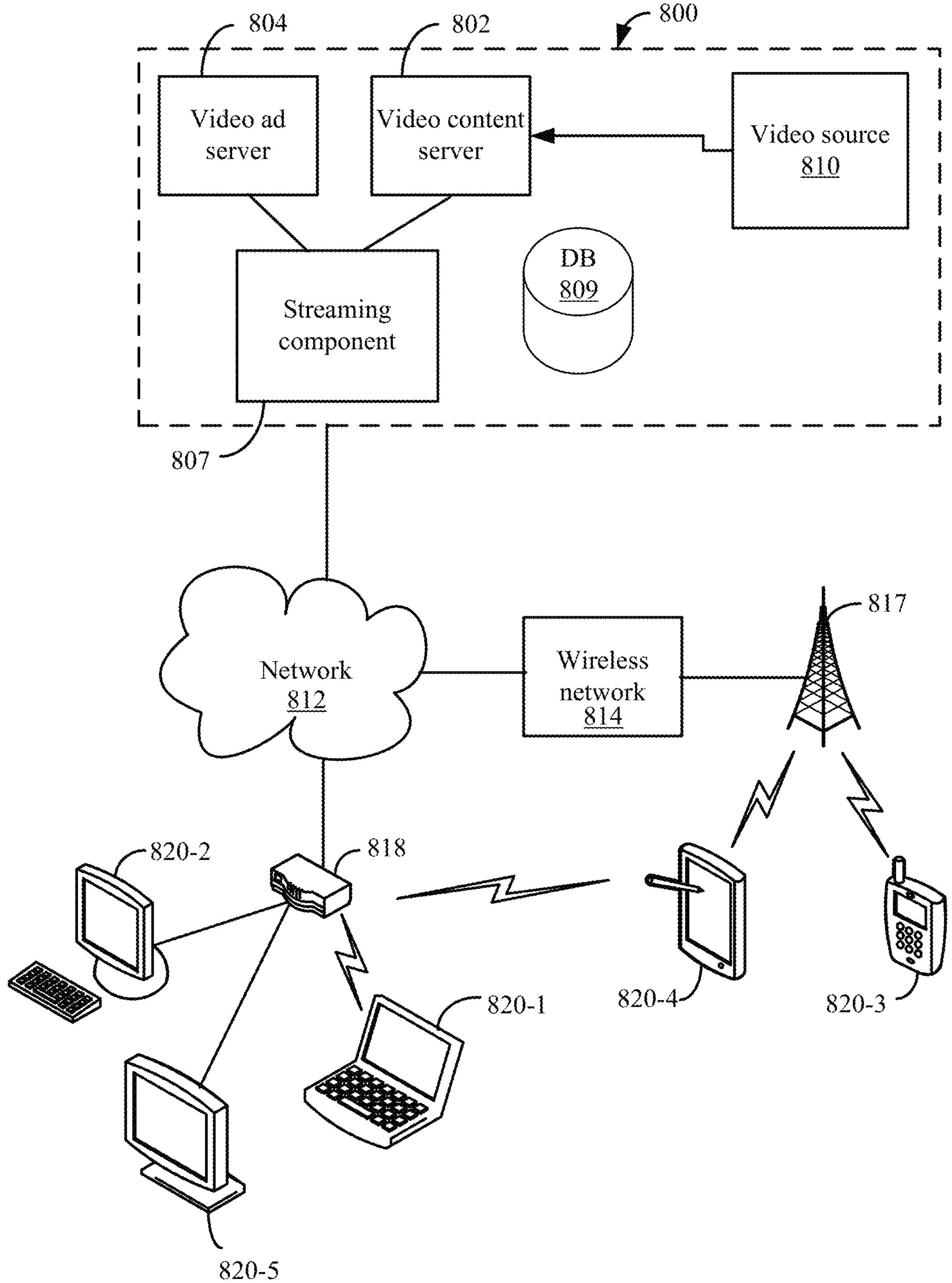
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless network 814 (e.g., a wireless cellular telecommunications network (WCS)), or some combination of these or similar networks.

One or more client devices 820 may be in communication with the video streaming system 800, via the data communication network 812, wireless network 814, or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for wireless network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HyperText Transfer Protocol (HTTP) and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
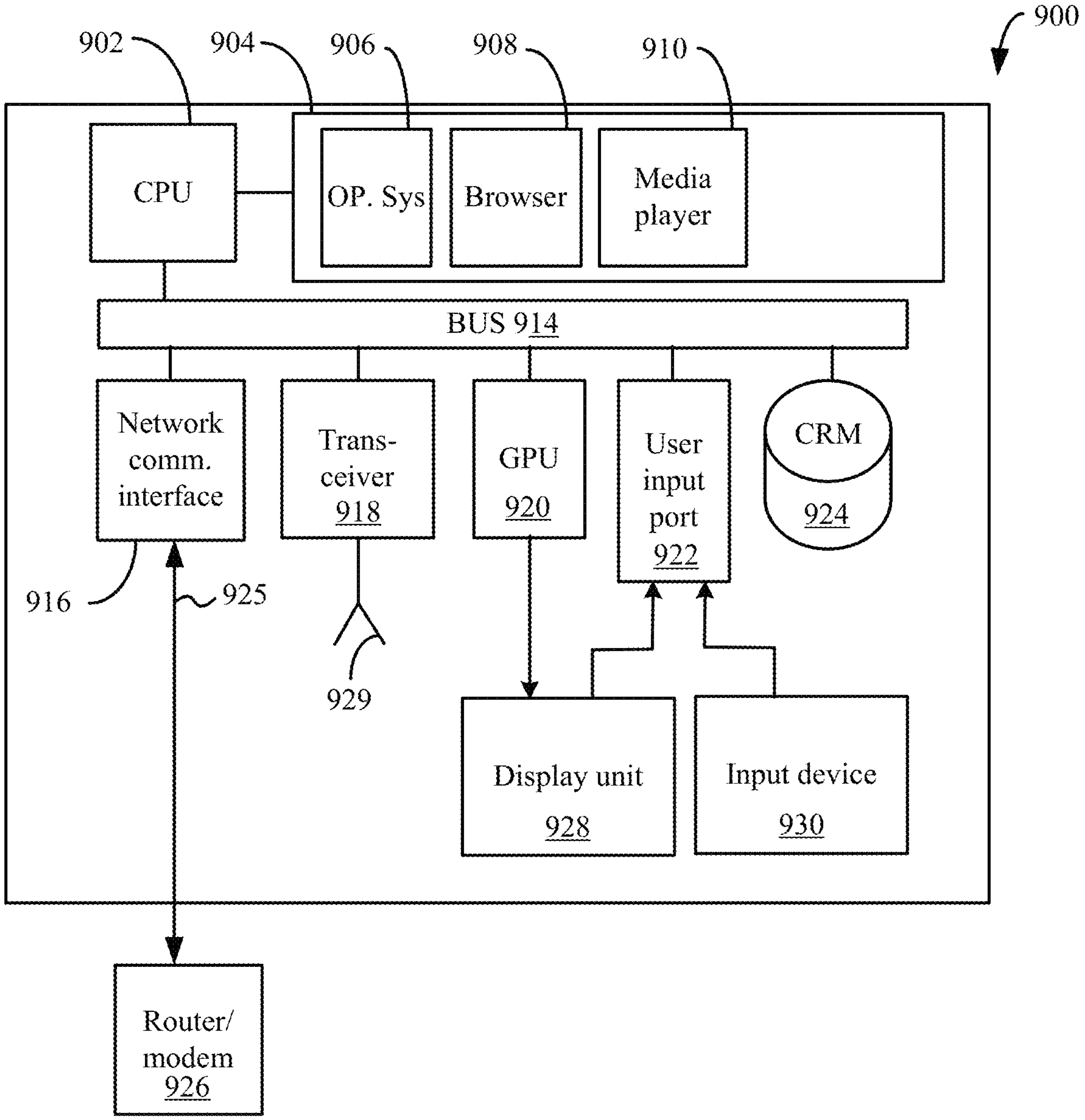
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules for operating system 906, browser 908, and media player 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A network communication (comm.) interface 916 may also be connected to the bus 914. The network communication interface 916 may provide or support two-way data communication between the apparatus 900 and one or more external devices, e.g., the streaming system 800, optionally via a router/modem 926 and a wired or wireless connection 925. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera, or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

determining, by a computing device, a playlist that includes links to segments of media content, wherein entropy slots are defined for the playlist, the entropy slots identifying positions in a list of segments of the media content where segments selected for delivery include a combination of a first version of the media content and a second version of the media content;

sending, by the computing device, the playlist, wherein:

each link in a first portion of the links corresponding to a first portion of the entropy slots includes a variable;

the playlist is created by substituting values for the variables in the first portion of the links, the values being associated with the first version of the media content and the second version of the media content;

each link in a second portion of the links that do not correspond to the entropy slots is associated with the first version of the media content; and the sent playlist is attributable to an individual request for the media content and comprises links to a unique sequence of segments of the media content;

receiving, by the computing device, requests for segments of the media content, the requests associated with links from the playlist, wherein:

when requests are associated with a link from the first portion of the links, the requests include information from the links that includes data based on a first value and a second value provided as a substitution for a variable included in the links, wherein the first value is associated with the first version of the media content and the second value is associated with the second version of the media content; and when requests are associated with a link from the second portion of the links, the links are associated with the first version of the media content; and sending, by the computing device, the segments of the media content that correspond to the links.

2. The method of claim 1, further comprising:

sending the first value or the second value for variables in the first portion of the links, wherein a combination of the first value and the second value is generated to create the unique sequence of segments of the media content from segments in the first version of the media content and the second version of the media content.

3. The method of claim 2, wherein the combination of the first value and the second value is generated based on information that is unique to the request for the media content.

4. The method of claim 3, wherein the information that is unique to the request comprises a user account identifier for a user account that requested the media content and a content identifier for the media content.

5. The method of claim 2, wherein the playlist comprises a first playlist, the method further comprising:

sending a second playlist, wherein the second playlist includes the first value or second value for the variables.

6. The method of claim 5, wherein the second playlist includes information that indicates different variants of the media content that can be selected, wherein the variants are associated with different playback characteristics.

7. The method of claim 1, further comprising:

receiving the request for the media content, wherein the request includes a request identifier is used to determine the values for the variables.

8. The method of claim 7, further comprising:

upon receiving the request identifier, sending the playlist includes at least the portion of the links that include a variable.

9. The method of claim 7, further comprising:

receiving another request for the media content, wherein the request does not include a request identifier; and sending another playlist that does not include any variables in links to segments of the media content.

10. The method of claim 1, further comprising:

determining whether the unique sequence of segments of the media content or a non-unique sequence of segments of the media content should be provided for the request for the media content.

11. The method of claim 10, wherein determining whether the unique sequence of segments of the media content or the non-unique sequence of segments of the media content should be provided is based on a scenario associated with the request.

12. The method of claim 11, wherein the scenario in which the unique sequence of segments of the media content is provided is when a recording of the media content is being requested or a watermarked copy of the media content is being provided.

13. The method of claim 1, wherein whether a segment associated with an entropy slot is selected for delivery from the first version of the media content or the second version of the media content, the media content appears the same to a viewer.

14. A non-transitory computer-readable storage medium having stored thereon computer executable instructions, which when executed by a computing device, cause the computing device to be operable for:

determining a playlist that includes links to segments of media content, wherein entropy slots are defined for the playlist, the entropy slots identifying positions in a list of segments of the media content where segments selected for delivery include a combination of a first version of the media content and a second version of the media content;

sending the playlist, wherein:

each link in a first portion of the links corresponding to a first portion of the entropy slots includes a variable;

the playlist is created by substituting values for the variables in the first portion of the links, the values being associated with the first version of the media content and the second version of the media content;

each link in a second portion of the links that do not correspond to the entropy slots is associated with the first version of the media content; and the sent playlist is attributable to an individual request for the media content and comprises links to a unique sequence of segments of the media content;

receiving requests for segments of the media content, the requests associated with links from the playlist, wherein:

when requests are associated with a link from the first portion of the links, the requests include information from the links that includes data based on a first value and a second value provided as a substitution for a variable included in the links, wherein the first value is associated with the first version of the media content and the second value is associated with the second version of the media content; and when requests are associated with a link from the second portion of the links, the links are associated with the first version of the media content; and sending the segments of the media content that correspond to the links.

15. A method comprising:

sending, by a computing device, a first value or second value for substitution for variables in a first portion of links in a plurality of links, wherein:

entropy slots are defined for a playlist, the entropy slots identifying positions in a list of segments of media content where segments selected for delivery include a combination of a first version of the media content and a second version of the media content, each of the first value or second value for variables in the first portion of links is associated with either the first version of a media content or the second version of the media content, and the first value for variables in a second portion of links are associated with the first version of the media content;

sending, by the computing device, the playlist that includes links to segments of media content, wherein each link in at least the first portion of the links corresponding to a first portion of the entropy slots includes a variable;

receiving, by the computing device, a request for a segment of the media content, the request based on a link from the playlist and a the first value or the second value; and sending, by the computing device, the segment of the media content that corresponds to the link.

16. The method of claim 15, wherein a combination of the first value and the second value is generated based on information that is unique to the request for the media content.

17. The method of claim 15, wherein the playlist comprises a first playlist, the method further comprising:

sending a second playlist, wherein the second playlist includes the first value or the second value for substitution in the plurality of links.

18. A method comprising:

receiving, by a computing device, a playlist that includes links to segments of media content, wherein:

entropy slots are defined for the playlist, the entropy slots identifying positions in a list of segments of the media content where segments selected for delivery include a combination of a first version of the media content and a second version of the media content, and each link in at least a first portion of the links corresponding to a first portion of the entropy slots includes a variable;

determining, by the computing device, a first value or a second value to insert into each link in the at least the first portion of the links for a variable that was included in each link, wherein the first value is associated with the first version of the media content and the second value is associated with the second version of the media content, wherein:

a unique sequence of segments of the media content is created using the links, including the at least the first portion of the links in which the first value or the second value was inserted in place of variables, to request segments of media content; and each link in a second portion of the links that do not correspond to the entropy slots is associated with the first value for the first version of the media content;

sending, by the computing device, a request for a segment that is associated with the link from the playlist; and receiving, by the computing device, the segment of the media content that corresponds to the link.

19. The method of claim 18, further comprising:

receiving the first value or the second value for variables in the at least the portion of the links, wherein the first value or the second value is generated to create the unique sequence of segments of the media content from segments in the first version of the media content and the second version of the media content.

20. The method of claim 19, wherein the playlist comprises a first playlist, the method further comprising:

receiving a second playlist, wherein the second playlist includes the values for the variables.

21. The method of claim 19, wherein determining the value to insert into the link comprises:

determining the first value or the second value for variables, wherein the first value or the second value is associated with the variable in the link.

22. The method of claim 18, further comprising:

sending a request for the media content; and receiving information that is usable to request the media content, wherein the information includes a unique request identifier is used to determine the first value or the second value for the variables.

23. The method of claim 22, wherein:

the playlist comprises a first playlist, and the information that is usable to request the media content is received in a request for a second playlist that lists variants that are available for the media content.

* * * * *